350-332 SR

XR 3,750,140

United States

Gray

[11] 3,750,140

[45] July 31, 1973

[54] OPTICAL DISPLAY DEVICE AND DRIVE CIRCUIT THEREFOR

[75] Inventor: Paul E. Gray, Winchester, Mass.

[73] Assignee: Veeder Industries Inc., Hartford, Conn.

[22] Filed: May 13, 1971

[21] Appl. No.: 142,916

[52] U.S. Cl. ........ 340/336, 235/92 EA, 340/324 R, 350/160 LC

[51] Int. Cl. ........ G08b 5/36

[58] Field of Search ........ 340/324 R, 336; 350/160 LC; 235/92 EA

[56] References Cited

UNITED STATES PATENTS

| | | | |
|---|---|---|---|
| 3,400,388 | 9/1968 | Blank | 235/92 EA |
| 2,813,229 | 11/1957 | Sacks | 315/173 X |
| 3,280,341 | 10/1966 | DuVall | 340/336 X |
| 3,343,128 | 9/1967 | Rogers | 315/169 R X |
| 3,505,804 | 4/1970 | Hofstein | 340/267 R X |
| 3,401,399 | 9/1968 | Tegholm | 340/324 R X |

*Primary Examiner*—David L. Trafton
*Attorney*—Prutzman, Hayes, Kalb & Chilton

[57] ABSTRACT

A liquid crystal indicator has a drive circuit wherein a DC drive voltage is converted to an AC signal for the indicator. The drive circuit includes a capacitor connected in series with the DC drive voltage and the liquid crystal indicator and a transistor paralleled with the capacitor. The bias circuit for the transistor includes a resistor and a diode connected in series and an oscillator is connected to the junction between the resistor and the diode of the bias circuit by a second diode which is poled to bleed bias current from the transistor upon negative excursions of the oscillations to turn the transistor off and on. A third diode connected to the common junction of the other diodes is also poled to bleed the bias current of the transistor to override the control signal from the oscillator and prevent a change in the conductive state of the transistor. A number of drive circuits each connected to an output of a decoder control the visualization of the several segments of the liquid crystal indicator to visualize different alphanumerical characters in accordance with the coded binary input to the decoder.

4 Claims, 1 Drawing Figure

3750140
OR IN 340/336

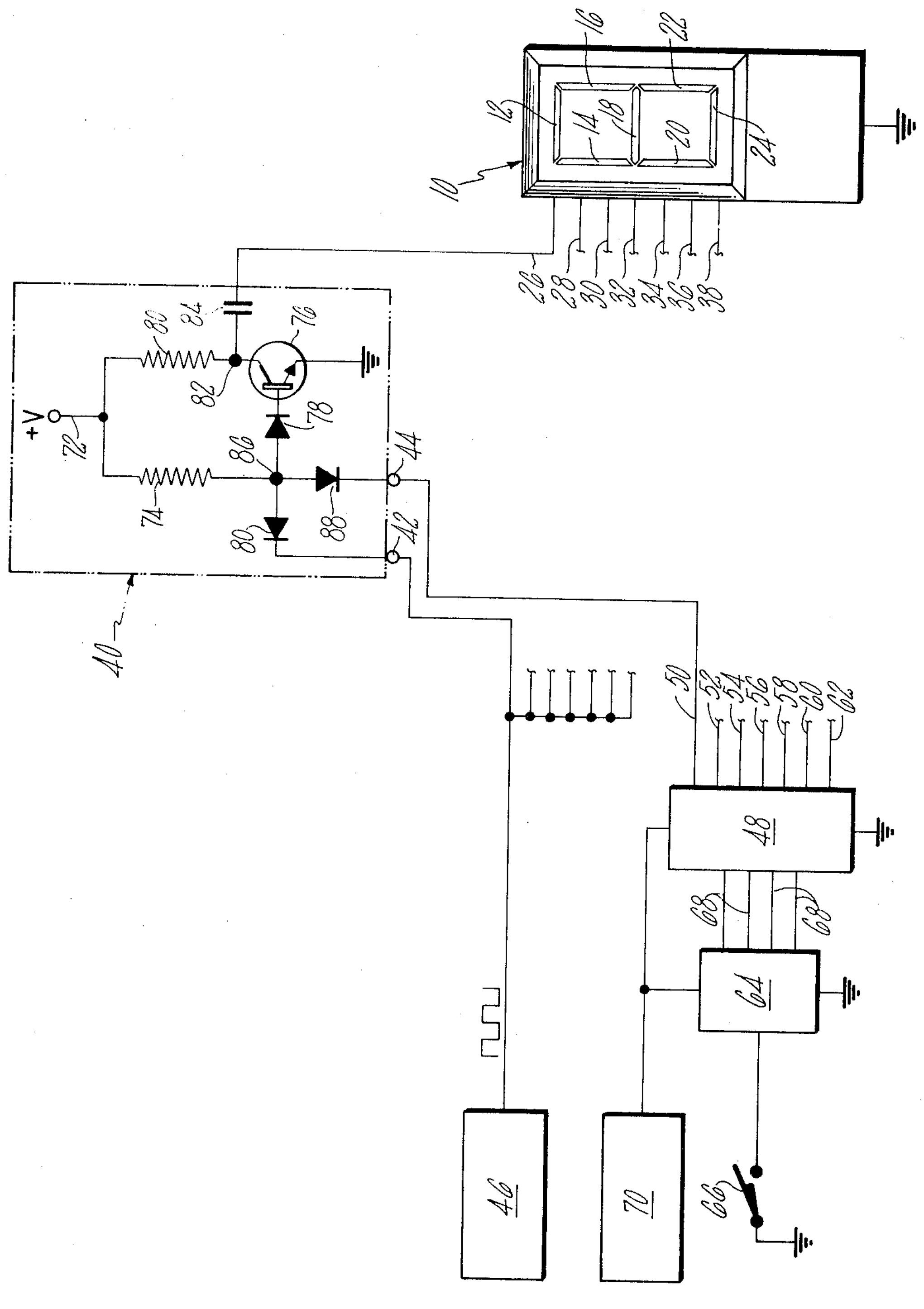
INVENTOR
PAUL E. GRAY
BY Brutzman, Hayes, Kalb and Chilton
ATTORNEYS

OPTICAL DISPLAY DEVICE AND DRIVE CIRCUIT THEREFOR

The present invention relates to optical display devices and more particularly to such a device having an improved drive circuit.

Nematic liquid crystal electro-optical devices are known in the art. Such devices operate by the rotation and orientation of domains or clusters of the optically anisotropic nematic composition upon the application of an electric field and may be employed as display elements for the display of alphanumeric characters as, for example, the seven segment numerals shown and described in U. S. Pat. No. 3,505,804 issued Apr. 14, 1970 and entitled "Solid State Clock." Such devices operate on a field effect phenomenon with the visualizing of the segments being produced by the turbulence created by the application of a series of voltage pulses of short duration, and it is the principal object of this invention to provide a new and improved drive circuit for such a device.

Another object of this invention is to provide a liquid crystal display device having a drive circuit which produces an AC signal from a DC source. Included in this object is the provision of a transistor controlled capacitor drive circuit for the device.

Other objects will be in part obvious and in part pointed out more in detail hereinafter.

The invention accordingly consists in the features of construction, combination of elements and arrangement of parts which will be exemplified in the construction hereafter set forth.

The single FIGURE of the drawing is a block and schematic diagram of an optical display device having the improved drive circuit of this invention.

Referring to the drawing, the optical display device 10 is represented as being of the type described in the aforementioned U.S. Pat. No. 3,505,804 and includes seven segments designated by the numerals 12, 14, 16, 18, 20, 22, 24, respectively. The display device 10 is provided with a plurality of inputs 26, 28, 30, 32, 34, 36, 38, each respectively connected to control the electric field imposed on one of the segments 12–24 to control its visibility. The inputs 26–38 are each respectively connected to receive a voltage signal from a drive circuit 40. For purposes of clarity, only one drive circuit 40 providing the drive signal for input 26 is shown, which in turn controls the visibility of, say, segment 12.

Drive circuit 40 has a pair of input terminals 42,44. The input 42 is connected to receive the output of an oscillator 46 which preferably generates square wave oscillations of fixed amplitude and of a frequency of, say, 600 hertz.

The input 44 of the drive circuit 40 is connected to receive the output signal from one of the seven output terminals 50, 52, 54, 56, 58, 60, 62 of binary decoder 48.

The input to the decoder 48 is provided by a counter 64 which measures the pulses generated by a pulse former such as switch 66 and produces a coded binary output at its output leads 68 representative of the numerals 0–9. A DC control voltage supply 70 is provided for the counter 64 and the decoder 48.

It can readily be seen that the different combinations of output produced on the seven output terminals 50–62, respectively, can represent a binary digit since each of the outputs 50–62 are connected, respectively, to one of the inputs 26–38 of the optical display device 10 through a control circuit 40, and the optical display device 10 can provide a visual representation of the numeral represented by the coded binary signal applied to the input of decoder 48.

A drive voltage of, say, 60 volts is applied to the drive circuit 40 at 72. With no control signals at inputs 42 and 44 of drive circuit 40, current flows through bias resistor 74, diode 78 and the base-emitter junction of NPN transistor 76. Such current is sufficient to bias transistor 76 into saturation so that junction 82 is essentially connected to ground and the voltage drop across resistor 80 is substantially equal to the supply voltage (except for the voltage drop caused by the collector-emitter saturation voltage which is about 0.3 volt). Under such circumstances, the voltage potential across capacitor 84 is approximately zero and well below the threshold value necessary to initiate turbulence in segment 12 of optical display device 10.

The bias current through the base-emitter junction of transistor 76 produces a voltage drop across the junction of approximately 0.7 volt. The bias current also causes a similar voltage drop of approximately 0.7 volt across diode 78. Thus, the voltage with respect to ground at junction 86 is approximately 1.4 volts with open circuit conditions existing at inputs 42 and 44 of drive circuit 40.

When the square wave output from oscillator 46 is applied to input 42 of drive circuit 40, the operation of transistor 76 is changed. As stated above, the voltage at junction 86, due to the base-emitter bias current of transistor 76, is about 1.4 volts with open circuit conditions existing at inputs 42 and 44. With the threshold voltage across diode 80 also equal to about 0.7 volt, it is apparent that diode 80 will conduct if the excursions of the square wave output of oscillator 46 at the low point thereof creates a voltage drop across diode 80 of 0.7 volt or more. To assure this result, the signal level of the output oscillator 46 is selected so as to range from a minimum of less than 0.5 volt to a maximum of more than 1.0 volt.

When diode 80 conducts, the voltage at junction 86 is reduced to about 0.7 volt and transistor 76 is biased to nonconduction. With transistor 76 in its nonconducting state, the voltage at junction 82 rises to the level of the supply voltage at 72. This, in turn, causes capacitor 84 to charge through optical display device 10 and resistor 80 to provide the positive half cycle of voltage applied to the signal of segment 12 of the optical display device 10.

At the high point, i.e., 1.0 volt, of the excursions of the oscillations of oscillator 46, the voltage at input 42 is greater than 1.0 volt. Since the junction drop of diode 80 is approximately 0.7 volt, and the voltage at junction 86 approximately equal to 1.4 volt, the voltage between junction 86 and input 42 is insufficient to cause diode 80 to conduct and the current therethrough ceases. The total bias current through bias resistor 74 then passes through the base-emitter junction of transistor 76 to bias the transistor into conduction so that the voltage at junction 82 again drops to approximately ground level. This, in turn, causes capacitor 84 to discharge through the optical display device 10 and transistor 76 to apply the negative half cycle of the pulsed voltage on the segment 12 and the input 26.

It is apparent that since the high and low points of the excursions of the square wave output of oscillator 46 turn the transistor 76 off and on, the frequency of the output of oscillator 46 determines the frequency of the alternating current applied to the input to the optical display device from the DC drive voltage at 72.

As indicated above, a DC control voltage 70 is applied to the counter 64, and the pulse former 66 drives the counter to produce successive counts. These counts produce a coded binary output at 68 which is fed into decoder 48 to produce different combinations of outputs at its seven terminals 50–62 to represent a binary digit corresponding to the number of pulses triggering counter 64.

As heretofore described, the square wave output of oscillator 46 changes the voltage level at junction 86 back and forth between the levels of 1.4 and 0.7 volt to turn transistor 76 off and on and provide a series of voltage pulses applied to the display segments of the optical display device 10 to visualize the signals.

Junction 86 is also connected to the output 50 of decoder 48 through diode 88 and input 44 of the drive circuit 40. Since diode 88 is connected in parallel with diode 80 for bleeding current from the junction 86, the signal level output 50 can override the oscillations of oscillator 46 when the voltage level at output 50 is low, say, 0.5 volt and voltage level of the square wave output of the oscillator is high. Under such conditions, diode 88 conducts to drop the voltage at junction 86 to approximately 0.7 to bias transistor 76 to nonconduction so that the voltage applied to the segment 12 of optical display device 10 remains at a constant level.

In practice, the output signal at each 50–62 of the decoder 48 should have approximately the same minimum voltage level as the output of oscillator 46, say, less than 0.5 volt.

It is apparent that when the signal level at input 44 is high, say, about 1.0 volt, the voltage drop across diode 88 is insufficient for the diode to pass current and the voltage at junction 86 continues to vary under the control of the oscillations from oscillator 46 to pulse the voltage to the optical display device 10 at the frequency of oscillation of oscillator 46, i.e., 600 hertz. Stated another way, with the maximum output voltage at the output 50 of decoder 48, the segment 12 will be visualized. However, when the signal voltage at output 50 is low, the current passing through diode 88 reduces the voltage level at junction 86 to prevent conduction of transistor 76 so that a constant voltage is applied to capacitor 84 and segment 12 is not visualized.

The outputs 52–62 of the decoder 48 may each be connected to the inputs 28–38 of the optical display device 10 through a drive circuit 40 to control the segments 14–24, respectively, in accordance with the coded binary signal applied at the input of decoder 48 so that the numerals 0–9 may be visualized by the optical display device 10.

From the foregoing, it is apparent that this invention provides an optical display device having a unique transistor-capacitor drive circuit for producing a series of AC pulses from a DC source.

As will be apparent to persons skilled in the art, various modifications, adaptations and variations of the foregoing specific disclosure can be made without departing from the teachings of the present invention.

What is claimed is:

1. A liquid crystal indicator having at least one symbol capable of visualization by a series of pulses of short duration and a drive circuit therefor, said drive circuit comprising:

a pulse former, a counter responsive to said pulse former to generate a coded binary output signal, a source of DC triggering pulses, a drive circuit responsive to said triggering pulses to actuate said display device, and electric circuit means responsive to said counter to selectively override said triggering pulses to change the visualization of said symbol, said drive circuit comprising:

a capacitor connected in series with said liquid crystal indicator, a source of DC drive voltage for charging said capacitor through a resistor, a transistor connected in parallel with said serially connected capacitor and liquid crystal indicator to provide a discharge path for said capacitor, a bias circuit for said transistor to provide a flow of current through a base emitter junction of said transistor sufficient to drive the transistor to saturation, and a diode poled to bleed bias current from said transistor connected to said source of triggering pulses to reduce the level of bias current below the saturation level of said transistor upon a reduction in the level of said triggering pulses.

2. The device of claim 1 wherein said liquid crystal indicator has a plurality of symbols each connected to the output of a drive circuit responsive to said coded binary output signal to selectively visualize said symbols to display different alphanumerical characters.

3. The device of claim 1 wherein said bias circuit includes a resistor and second diode connected in series with said DC voltage and the base of said transistor to establish a maximum level of current flow through the base of said transistor.

4. The device of claim 3 wherein said counter is connected to said drive circuit through a third diode poled to bleed bias current from said transistor to reduce the level of bias current below the saturation level of said transistor thereby to selectively override said triggering pulses and prevent a shift in the conducting status of said transistor.

* * * * *